United States Patent [19]

Marshall

[11] 4,226,522
[45] Oct. 7, 1980

[54] IMAGING DEVICE

[75] Inventor: Gerald F. Marshall, Grosse Pointe Woods, Mich.

[73] Assignee: Energy Conversion Devices, Inc., Troy, Mich.

[21] Appl. No.: 961,691

[22] Filed: Nov. 17, 1978

[51] Int. Cl.³ .............................................. G03B 27/54
[52] U.S. Cl. ......................................... 355/1; 355/67; 355/99
[58] Field of Search .................. 355/67, 1, 78, 68–71, 355/99, 113–121; 350/96, 10, 96, 15

[56] References Cited

U.S. PATENT DOCUMENTS

| | | | |
|---|---|---|---|
| 3,514,200 | 5/1970 | Bowker | 355/1 |
| 3,947,106 | 3/1976 | Hamaguchi et al. | 350/96.10 |
| 3,966,317 | 6/1976 | Wacks et al. | 355/19 |
| 4,125,315 | 11/1978 | Altman et al. | 355/1 |

*Primary Examiner*—L. T. Hix
*Assistant Examiner*—W. J. Brady
*Attorney, Agent, or Firm*—Wallenstein, Spangenberg, Hattis & Strampel

[57] ABSTRACT

A device for flash imaging, through an imaging mask at an imaging film plane, a dry-process imaging film having a layer of an energy dispersible image forming material on a surface thereof. The device comprises a solid, electromagnetic energy transmitting body advantageously in the form of a quartz prism having a generally frusto-pyramidal configuration. The energy transmitting body is associated with a source of electromagnetic energy, and acts to collect, direct, collimate and shape the energy emitted by the source to provide maximum utilization and substantially uniform distribution of the energy at the imaging film plane. The device is especially adapted for flash imaging microfiche cards comprised of pre-formed areas or zones of an energy dispersible image forming material, and enables an electromagnetic energy source such as a Xenon flash tube to be operated at lower energy levels for shorter time periods thereby appreciably reducing energy costs and prolonging the useful life of the flash tube, while at the same time providing excellent image resolution in all directions in the imaging film.

10 Claims, 8 Drawing Figures

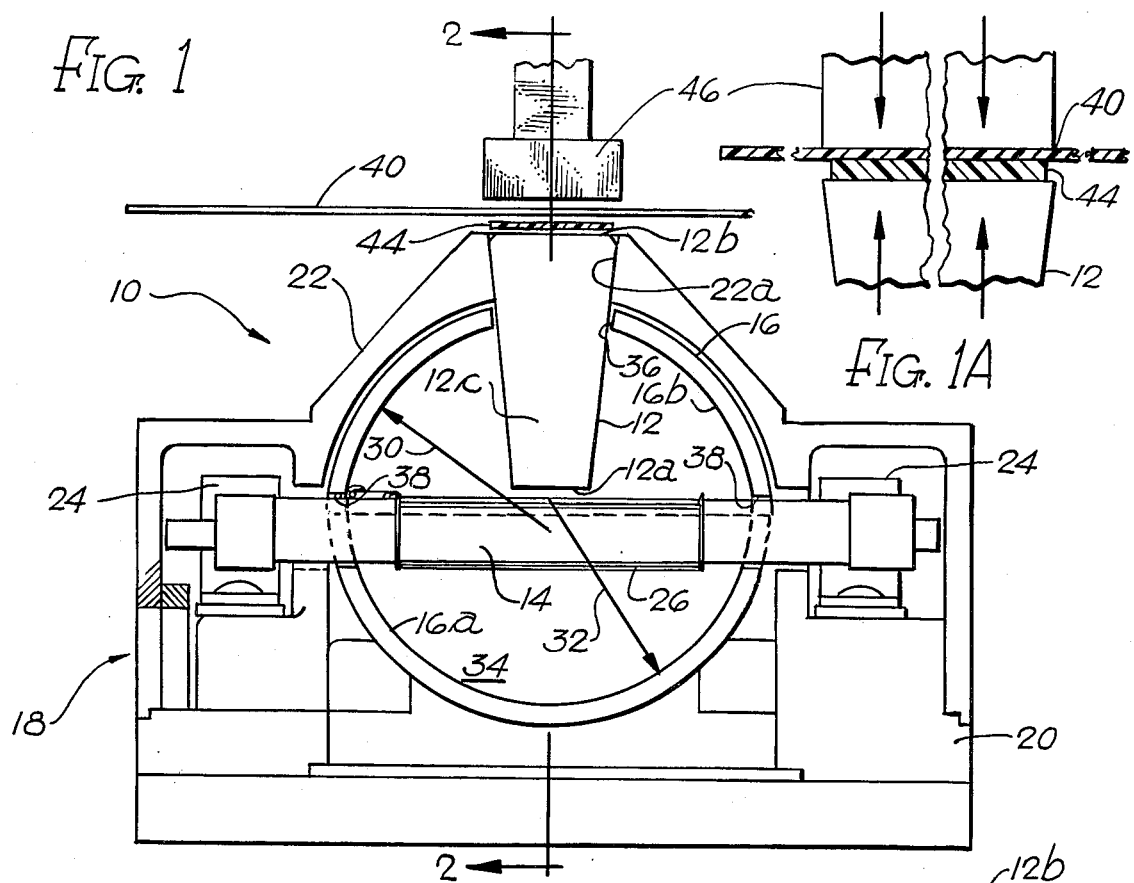
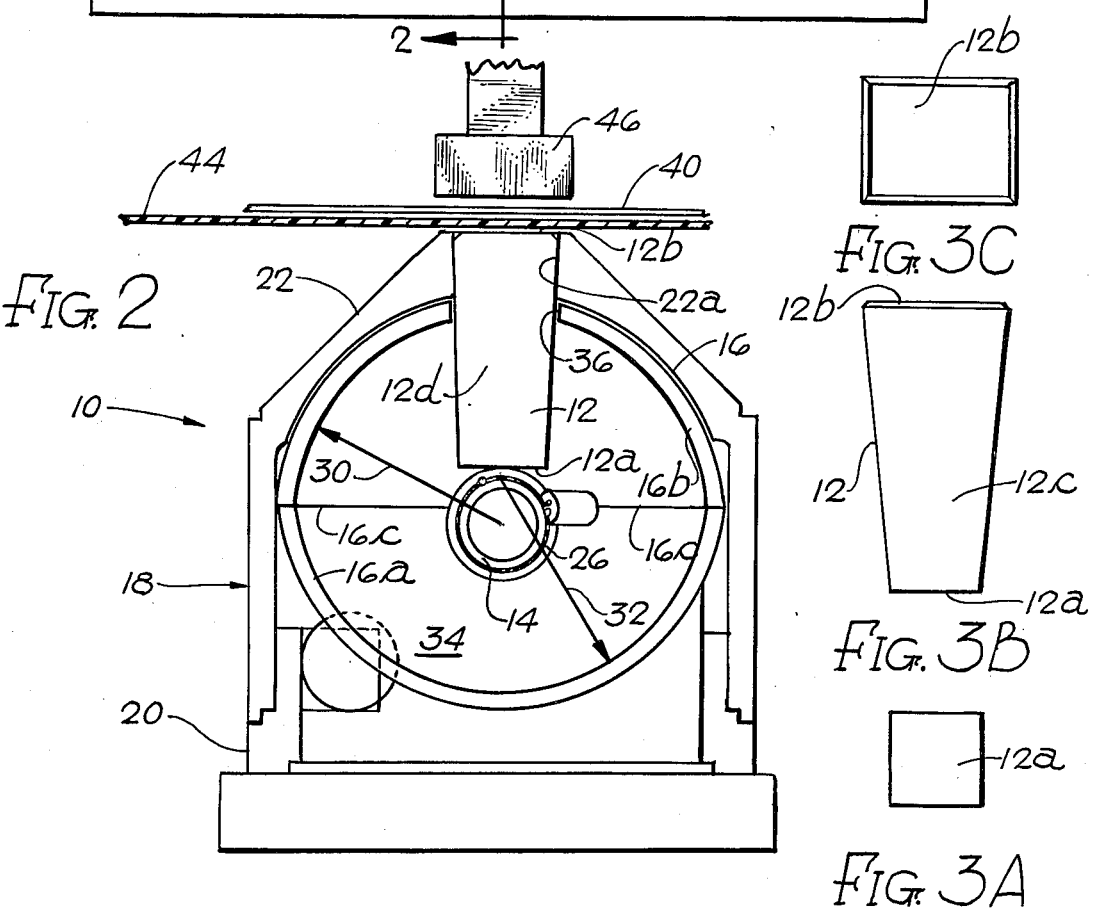
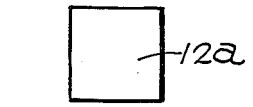

IMAGING DEVICE

The present invention relates to a device for flash imaging a dry-process imaging film.

Apparatus for dry-process, flash imaging an imaging film having a layer of an energy dispersible image forming material on a surface thereof is disclosed in U.S. Pat. No. 3,966,317. The apparatus shown in the patent includes an image transferring station where a single frame on a microform film is interposed over a microimaged frame in a mask film strip positioned above a glass window. A short pulse of energy, above a threshold value, emitted by a Xenon flash tube is passed through the glass window and the microimaged frame of the mask film strip onto the frame of the microform film which, preferably, is in the form of a microfiche or microform card. The energy pulse emitted by the Xenon flash tube is absorbed and scattered by the opaque areas of the microimaged frame of the mask film strip so as not to effectively reach the corresponding areas of energy dispersible material of the overlying frame of the microform film. However, the short energy pulse readily passes through the substantially transparent areas of the microimaged frame of the mask film strip to the corresponding overlying areas of energy dispersible material of the microform film where the energy pulse is absorbed. The absorption of the energy pulse by these areas heats the energy dispersible material to at least a softened or molten condition, whereupon the continuous layer of energy dispersible material at those areas is broken up and dispersed into small and relatively widely spaced globules to make those areas substantially transparent. The dispersion of the energy dispersion material at the heated areas is occasioned, in the main, by the surface tension of the heated material which causes the heated material to form such small and spaced globules. After the globules are so formed by the short pulse of energy emitted by the Xenon flash tube, they quickly cool and remain in that globular condition to provide substantially transparent areas in the frame of the microform film.

The energy collection efficiency of the film imaging arrangement shown in U.S. Pat. No. 3,966,317 is of the order of 40%. Stated differently, approximately 60% of the energy emitted by the Xenon flash tube employed in the apparatus of the patent is dissipated and lost. As a result, it is necessary to utilize a longer pulse width at a higher operating potential to provide a sufficient amount of energy at the film plane to accomplish dispersion of the energy dispersible image forming material on the imaging film employed in conjunction with the apparatus. The need for longer pulse widths and higher operating potentials not only acts to shorten the useful life of the Xenon flash tube, but, also, has an adverse affect on the energy costs of the apparatus and on the sharpness of the images produced.

In accordance with the present invention, an imaging device has been evolved which collects, directs, collimates and shapes energy emitted by an energy source, such as a Xenon flash tube, in a manner which permits maximum utilization and optimum distribution of the energy at the film plane thereby enabling substantially uniform and instantaneous dispersion of an energy dispersible image forming material on the imaging film to be attained. The energy collection efficiency of the imaging device is upwards of 80%, or about double that of the film imaging arrangement disclosed in U.S. Pat. No. 3,966,317. The uniquely high energy collection efficiency of the device has significant economic advantages in that a shorter pulse width at a lower operating potential can be employed in those instances where a Xenon flash tube is utilized as the energy source with the result that energy costs are reduced appreciably and the useful life of the Xenon flash tube is more than doubled. These results are achieved, moreover, while providing images in the imaging film having exceptionally high resolution characteristics.

Briefly, the imaging device of this invention comprises an energy transmitting body which advantageously is in the form of a truncated, or frusto-pyramidal shaped, solid, elongated prism-like member having an energy entrance facet and an energy outlet or exit facet, and side facets which are inclined with relation to the longitudinal axis of the prism-like member. The surface area of the entrance facet is less than the surface area of the exit facet, and adjacent side facets are each inclined at a different angle with relation to the longitudinal axis of the prism-like member. The area of the entrance and exit facets, and the length and degree of inclination of the side facets are such that energy collected by the prism-like member is directed, collimated and shaped in a manner to provide maximum utilization and optimum distribution of the energy at the film plane located at the energy exit facet of the prism-like member to ensure uniform image resolution. In a preferred embodiment of the device, the prism-like member is supported in proximity to an energy source, such as a Xenon flash tube, which is at least partly encased in energy intercepting and reflecting means. The energy intercepting and reflecting means advantageously comprises generally hemispherically shaped members each having a different center of curvature. The hemispherically shaped members desirably are supported in a housing and act to intercept and reflect energy from the energy source into the entrance facet of the prism-like member. An imaging mask is provided at the exit facet of the prism-like member and is interposed between the exit facet and the film or microfiche card to be imaged to enable energy to be applied to the film in a preselected pattern. The device is lightweight and compactly constructed, and is especially suitable for use in the apparatus disclosed in U.S. Pat. No. 3,966,317.

The foregoing and other features and advantages of the imaging device will become apparent to those skilled in the art upon reference to the following description, claims and drawings in which:

FIG. 1 is a sectional view in elevation of an embodiment of the device;

FIG. 1A is an enlarged fragmentary view partly in section, showing the imaging mask and the microfiche card in contact during imaging with the device;

FIG. 2 is a sectional view taken substantially along line 2—2 of FIG. 1;

FIGS. 3A, 3B and 3C are views of the bottom, side and top, respectively, of the energy transmitting body as illustrated in FIGS. 1 and 2.

Figure 3:
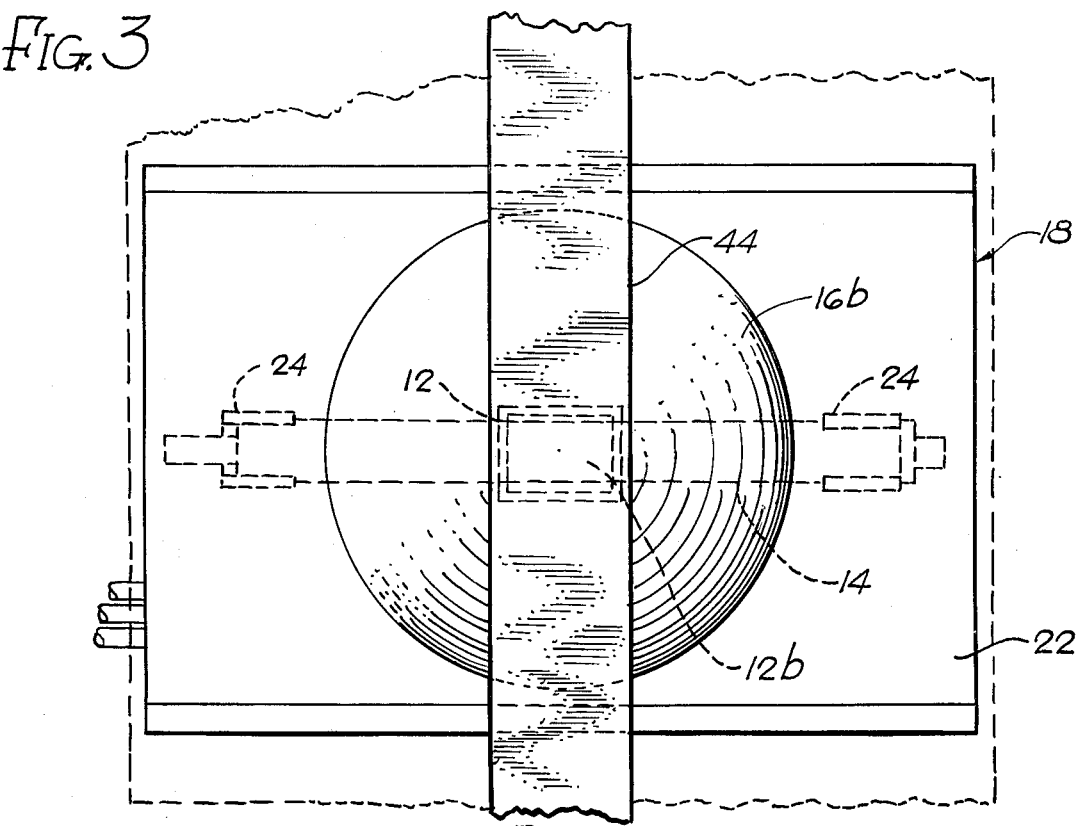
FIG. 3 is a plan view of the embodiment of the device illustrated.

The form of the imaging device illustrated in FIGS. 1 and 2, and designated generally at 10, includes an electromagnetic energy transmitting member or body 12, an electromagnetic energy source 14, and energy intercepting and reflecting means generally designated at 16. A housing 18, comprising a base portion 20 and a top or cover portion 22, is provided for supporting the components of the imaging device in operative relation with respect to one another.

The energy transmitting member 12 advantageously comprises a truncated, or frusto-pyramidal-shaped prism-like element formed of a substantially clear, solid, energy transmitting material. While the member 12 may be fabricated of various materials, a particularly desirable material is a high purity quartz available commercially under the trade designation Amersil, Grade T-19, Suprasil. The member 12, as shown, has an energy entrance facet 12a, an energy exit facet 12b, and two pairs of inclined side facets 12c—12c, and 12d—12d. The entrance facet 12a has side margins which are substantially equal in length, and, therefore, the facet 12a is square in shape. The adjacent side margins of the exit facet 12b are unequal in length, and, therefore, the facet 12b is rectangular in shape. Each of the margins of the exit facet 12b, as shown, is beveled. The entrance facet 12a has a surface area which is less than the surface area of the exit facet 12b, and each of the facets 12a and 12b lies in a plane which is mutually perpendicular to the longitudinal axis of the member 12 and which is substantially parallel to the plane of the other. The side facets 12c—12c and 12d—12d of the member 12 are each inclined at an angle with relation to the longitudinal axis of the member 12, and each pair of side facets 12c—12c and 12d—12d is inclined at a different angle with relation to said axis than is the other pair.

The surface area of the entrance facet 12a and the exit facet 12c, and the length of the side facets 12c—12c and 12d—12d, and the angles of inclination of the sides facets with relation to the longitudinal axis of the member 12 are predetermined to enable energy from the source 14 to be collected, directed, collimated and shaped by the member 12 in a manner to provide maximum utilization and substantially uniform dispersion of the energy at the film plane. By way of illustration, an energy transmitting body having utility in apparatus of the type shown in U.S. Pat. No. 3,966,317 and being capable of meeting the foregoing desiderata would have an essentially square entrance facet with side margins approximately 0.354 inch (8.99 mm) in length, and a rectangular exit facet having side margins, as measured at the top of the beveled edges of the facet 12b, approximately 0.394 inch (10 mm) wide and 0.492 inch (12.49 mm) long. The length of the member 12 as measured along its longitudinal axis is approximately 0.945 inch (24 mm). The angle of inclination of the narrower, that is, facets 12d—12d, of the two pairs of side facets with relation to the longitudinal axis of the energy transmitting body would be approximately 1°30'55", while the corresponding angle of the wider, that is, facets 12c—12c, of the two pairs would be approximately 4°28'39".

In the embodiment of the imaging device 10 illustrated in FIGS. 1-3, the energy transmitting member 12 is supported on the top or cover portion 22 of the housing 18 through an opening 22a therein. The exit facet 12b of the member 12 is substantially flush with the uppermost surface of the top or cover portion 22, while the entrance facet 12a of the member 12 is maintained in spaced relation with respect to the energy source 14. The energy source 14, as shown, is similar to the energy source disclosed in U.S. Pat. No. 3,966,317, and comprises a Xenon flash tube such as a Model No. FX-255C-.75 of EG & G Company. The Xenon flash tube has an electrical input of a maximum of about 50 Joules. It desirably is a broad band type of the tube having a range from UV to infrared with wavelengths of about 2000 to about 10,000 Angstroms.

The ends of the flash tube 14 are supported on spring clips 24—24 secured on the base portion 20 of the housing 18. A trigger or energizing coil 26, connected to a power source (not shown), is positioned on the outer surface of the flash tube 14 for energizing the tube.

The energy intercepting and reflecting means 16 of the imaging device 10 comprises hemispherically-shaped reflectors 16a and 16b each having a different center of curvature as represented by the arrows 30 and 32, respectively. The reflectors 16a and 16b may be formed of any suitable energy reflecting material such as glass mirrors, metal, or plastics. In the embodiment of the invention illustrated, the reflectors 16a and 16b advantageously are formed of a plastics material such as Plexiglas which has been front surface aluminum coated. The reflector 16a is supported on the base portion 20 of the housing 18, and has its center of curvature located at a point slightly below the center of the entrance facet 12a of the member 12 at the top of the tube 14. The reflector 16b is supported on the top or cover portion 22 of the housing 18, and has its center of curvature located directly below the center of curvature of the reflector 16a on the longitudinal axis of the flash tube 14. The radius of each of the reflectors 16a and 16b is of sufficient length to prevent dispersion of the aluminum reflective coating on the surfaces of the reflectors by the high intensity energy emitted by the flash tube 14. In the embodiment of the device illustrated, the radius of each reflector is approximately 0.812 inch (20.6 mm). The center of curvature of each of the reflectors 16a and 16b are displaced in the manner described to enable reflected energy emitted by the flash tube 14 to pass around the tube 14 into the entrance facet of the member 12. The extent of the displacement in the device shown is approximately 0.120 inch (3 mm). The margins 16c—16c of the reflectors 16a and 16b are positioned in abutting relation, and the reflectors thus form a chamber 34 for the entrance facet 12a of the member 12 and the flash tube 14. To this end, the reflector 16b has an opening 36 at its pole for receiving the member 12, and the reflector 16b is provided with opposed openings 38—38 at the ends of its declination axis for receiving the tube 14.

As indicated above, the imaging device 10 of the present invention is especially adapted for use in conjunction with apparatus such as is disclosed in U.S. Pat. No. 3,966,317. Thus, as shown in the drawings, a microform, preferably in the form of a microfiche card 40, having the normal 4×6 inch dimensions and capable of receiving up to 96 microimages at a 24× reduction ratio, desirably is used for imaging with the device. The card 40 comprises a flexible and substantially transparent synthetic plastic substrate such as Mylar (polyethylene glycol terephthalate), for example, having a thickness in the range of from about 3 or 5 to about 15 mils. Coated on the substrate, preferably by vacuum deposition, is a thin, continuous solid layer of an energy dispersible image forming material such as bismuth, or a bismuth alloy, having a thickness of from about 1000 A to about 2000 A. The layer of energy dispersible image forming material is heat absorbing, and, in the case of bismuth, has a melting point of about 271° C. A protective overlayer advantageously is applied on the energy dispersible layer. The protective overlayer desirably comprises a substantially transparent synthetic plastic film of Saran, polyurethane, or the like, and has a thickness of about 1 micron.

Figure 4:
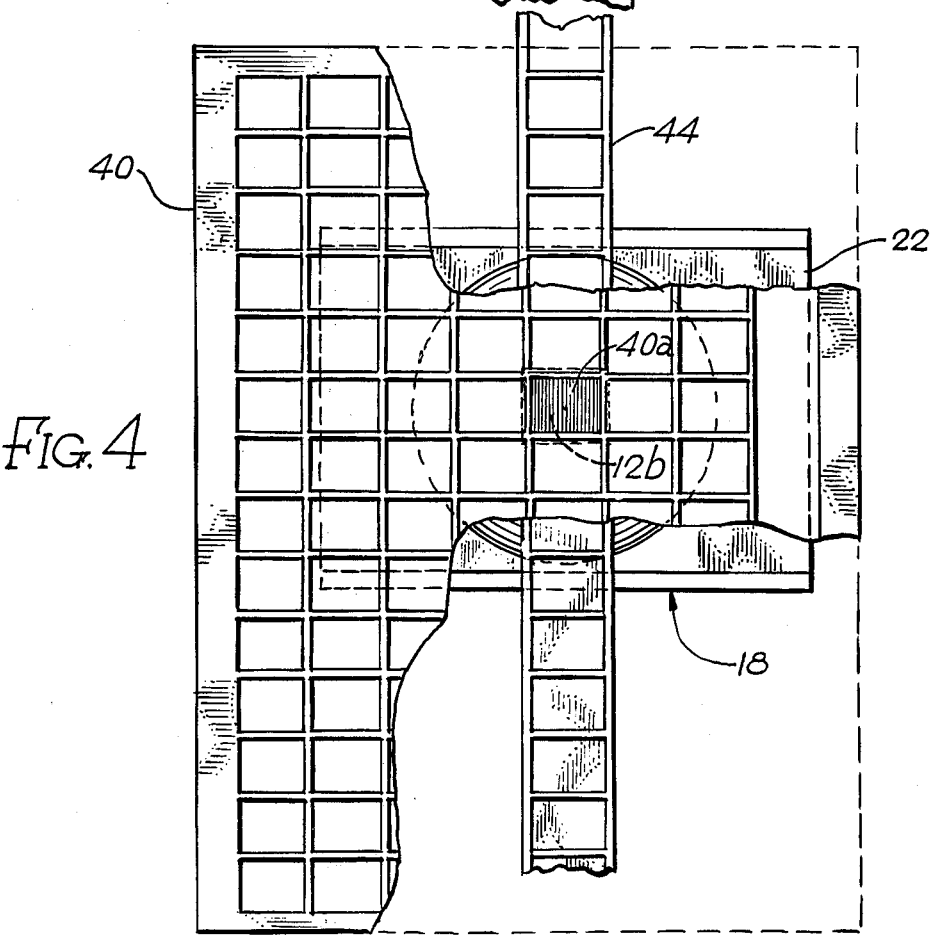
FIG. 4 is a fragmentary, top view showing the imaging mask used in forming an image on an area or zone of a mixcrofiche card in position in relation to the exit facet of the energy transmitting body of the device.

In utilizing the image device 10 to form an image on an area or zone 40a of the card 40, a microimaged mask film strip 44, such as is described in the aforementioned U.S. patent, is positioned between the exit facet 12b of the member 12 and the area 40a of the card 40, see FIG. 4. The area 40a of the card 40 is brought into contact with the mask film strip 44, and maintained in that position during imaging, by means of a movable plunger 46. The Xenon flash tube 14 is then energized to provide a short pulse of electromagnetic or radiant energy. The short pulse of energy produced by the tube 14 is within the range of about 20 microseconds to about 1 millisecond, preferably about 40 microseconds. Due to the combined high energy collection efficiency of the member 12 and the reflectors 16a and 16b, the flash pulse may be made approximately 40% to 50% shorter than would be otherwise possible. Concomitantly, the energization of the tube 14 can take place at a lower operating potential. These factors combine to appreciably extend the useful life of the tube 14, enabling up to 100,000, or more, flashes to be obtained from a single Xenon tube of the size described above.

The short pulse of energy emitted by the tube 14 is collected at, and reflected into the entrance facet 12a of the member 12. As the energy passes through the member 12, it is collimated to the greatest extent possible and directed toward the exit facet 12b where it emerges in a shape to provide maximum utilization and optimum distribution of the energy at the film plane. More specifically in this latter connection, the collimated energy emerging from the exit facet 12b of the member 12 is formed or shaped in a manner such that if a grid were placed at the exit facet 12b, the energy would emerge from the grid in the form of tiny inverted cones, the vertical or longitudinal axis of each of which being substantially perpendicular to the surface of the exit facet.

As the energy emerges from the exit facet 12b, it passes through the transparent areas of the microimaged mask 44 to the layer of energy dispersible material on the area or zone 40a of the card 40 where the energy is absorbed. This absorption of the energy by the energy dispersible material at these areas causes the energy dispersible material to become soft or molten, whereupon the continuous solid layer of energy dispersible material at the areas of the zone 40a where the energy is absorbed is broken up and dispersed into small and widely spaced globules to make these areas substantially transparent. The dispersion of the energy dispersible material at the energy absorbing areas is occasioned in the main by the surface tension of the heated material to form such small and widely spaced globules. Again, due to the combined highly efficient energy collecting capabilities of the member 12 and the reflectors 16a and 16b, and the ability of the member 12 to collimate and direct the energy toward the plane of the microfiche card 40, dispersion of the energy dispersible material in the areas thereof where energy absorption occurs, and, therefore, image resolution takes place substantially uniformly over the entire area or zone 40a. As indicated above, after the globules are so formed by the short pulse of energy from the tube 14, they almost instantaneously cool and remain in that globular condition to provide a sharp, high resolution microimage on the card corresponding to the microimage of the mask film strip 44.

While the invention has been illustrated and described in relation to a specific embodiment thereof, it should be understood that various modifications may be made in the device without departing from the spirit and scope of the invention.

What is claimed is:

1. Device for flash imaging at an imaging film plane an imaging film having a layer of an energy dispersible image forming material thereon, comprising: an energy source capable of emitting electromagnetic energy of an intensity sufficient to cause dispersion of the energy dispersible image forming material on the imaging film, an imaging mask at the imaging film plane for enabling electromagnetic energy from said energy source to be applied therethrough in a preselected pattern to the imaging film having the layer of an energy dispersible image forming material thereon, and electromagnetic energy collecting means associated with the energy source, said energy collecting means including a single, solid, one-piece, elongated, electromagnetic energy transmitting body for intercepting and transmitting electromagnetic energy directly from said energy source to the imaging mask, said body having an energy entrance facet and an energy exit facet each of which lies in a plane which is substantially parallel to the plane of the other and substantially transverse to the longitudinal axis of the energy transmitting body, said energy transmitting body further having opposed pairs of non-parallel side facets which diverge in the direction of the energy exit facet of the energy transmitting body, the spacing of the energy entrance and exit facets with relation to one another and the angle of inclination of the opposed pairs of side facets of the energy transmitting body with relation to the longitudinal axis thereof being such as to direct, collimate and shape the electromagnetic energy passing through the energy transmitting body and the imaging mask in a manner to provide maximum utilization and substantially uniform distribution of the electromagnetic energy at the imaging film plane whereby substantially the full intensity of the directed, collimated and shaped electromagnetic energy is applied to the imaging film through the imaging mask thereby enabling rapid and substantially uniform dispersion of the energy dispersible image forming material on the film to be attained in a preselected pattern.

2. A device according to claim 1 wherein the side facets of the energy transmitting body comprise opposed pairs of facets, each pair having different dimensions, and being inclined at a different angle with respect to the longitudinal axis of the energy transmitting body, than the other pair.

3. A device according to claim 1 wherein the energy collecting means further includes energy intercepting and reflecting means which form a chamber for the energy entrance facet of the energy transmitting body.

4. A device according to claim 3 wherein the chamber formed by the energy intercepting and reflecting means encases at least a portion of the energy source.

5. A device according to claim 1 wherein the imaging mask is positioned at the energy exit facet of the energy transmitting body, and is adapted to be brought into contact with the energy exit facet during imaging.

6. A device for flash imaging at an imaging film plane an imaging film having a layer of an energy dispersible image forming material thereon, comprising: an energy source capable of emitting electromagnetic energy of an intensity sufficient to cause dispersion of the energy dispersible image forming material on the imaging film, an imaging mask at the imaging film plane for enabling electromagnetic energy from said energy source to be applied therethrough in a preselected pattern to the imaging film having the layer of an energy dispersible image forming material thereon, and electromagnetic energy collecting means associated with the energy source, said energy collecting means including a solid, elongated, electromagnetic energy transmitting body having an energy entrance facet and an energy exit facet each of which lies in a plane which is substantially parallel to the plane of the other and substantially transverse to the longitudinal axis of the energy transmitting body, said energy transmitting body further having side facets which are inclined with relation to the longitudinal axis of the energy transmitting body, the spacing of the energy entrance and exit facets with relation to one another and the angle of inclination of the side facets of the energy transmitting body with relation to the longitudinal axis thereof being such as to direct, collimate and shape the electromagnetic energy passing through the energy transmitting body and the imaging mask in a manner to provide maximum utilization and substantially uniform distribution of the electromagnetic energy at the imaging film plane whereby substantially the full intensity of the directed, collimated and shaped electromagnetic energy is applied to the imaging film through the imaging mask thereby enabling rapid and substantially uniform dispersion of the energy dispersible image forming material on the film to be attained in a preselected pattern, said energy collecting means further including energy intercepting and reflecting means comprising hemispherically-shaped members each having a different center of curvature, said members forming a chamber for the energy entrance facet of the energy transmitting body.

7. A device according to claim 6 wherein one of the hemispherically shaped members has an opening for admitting the energy entrance facet of the energy transmitting body into the chamber defined by said members.

8. A device according to claim 6 wherein the energy source is located at the center of curvature of one of the hemispherically-shaped members.

9. A device according to claim 6 wherein the center of curvature of one of the hemispherically-shaped members is located at a point adjacent to the energy entrance facet of the energy transmitting body and in spaced relation to the energy source.

10. A device according to claim 6 wherein the hemispherically-shaped members are metallic coated, and have a radius sufficient to prevent energy emitted by the energy source from dispersing the metal comprising said coating.

* * * * *